FIG.I.

INVENTOR.
OWEN W. ROHN

BY

Learman, Learman & McCulloch

INVENTOR.
OWEN W. ROHN

INVENTOR.
OWEN W. ROHN

United States Patent Office 3,493,996
Patented Feb. 10, 1970

3,493,996
PELLETIZING APPARATUS AND EXTRUSION DIE
Owen W. Rohn, Saginaw, Mich., assignor to Baker Perkins Inc., Saginaw, Mich., a corporation of New York
Filed Apr. 19, 1967, Ser. No. 632,012
Int. Cl. B29d 3/00; B29f 3/01, 3/04
U.S. Cl. 18—12                                    13 Claims

ABSTRACT OF THE DISCLOSURE

Pelletizing apparatus comprising an extruder with a coordinated die for the extrusion of strands of plastic material in which the rear face of the die is provided with at least one V-groove into which are set strand-forming passages, side by side, with the rear portions of the passages countersunk to form tapered, outwardly flaring rear openings located within the groove or grooves to provide a smooth, uniformly compressing flow path for the material to be extruded.

---

This invention relates to new, improved pelletizing apparatus, and more particularly to pelletizing apparatus comprising an improved extrusion die for the extrusion of plastic material in the form of strands which may be cut into pellets.

BASIS OF THE INVENTION

Known pelletizing apparatus comprises a suitable extruder which forwards the plastic material to be pelletized through coordinated conduit and through an extrusion die. The plastic material, emanating in the form of individual strands through the passages in the die, is then subjected to the cutting action of a rotary cutter knife assembly by passing the strands into the path of the rapidly rotating cutter knives.

Conventional extrusion dies generally used in pelletizing apparatus are of the character wherein a plate-like die body is traversed by a plurality of passages or bores. The bores may be arranged in one or more vertical or horizontal straight rows, or they may be arranged in circular fashion. In either case, conventional dies have flat surface areas formed at the rear portion of the die plate, against which the mass of flowable material is pressed by the extruder. The portions of the flowable material opposite the bores, flow readily out through the passages in the form of strands, but the material opposite the solid, flat portions of the die is held up for longer periods of time.

For optimum performance of the pelletizing apparatus, and to increase the flow rate of the plastic material, it is generally desirable to heat the plastic material, prior to extruding it through the die, to as high a temperature as is compatible with the chemical stability of the material, e.g., by the provision of suitable heaters, or heating coils around the die section of the extruder. The fractions of the heated plastic material which have only a short or very short residence time in the heated zone are not adversely affected by the elevated temperature. However, with many plastic materials, those portions of the material which are held up against the hot die plate for any extended time, start to deteriorate and partially decompose with the formation of spots of scorched or "burned" material in the hang-up areas. From time to time, particles of the scorched material break loose and are passed with the plastic material through the passages, contaminating the strands of plastic material and the pellets cut therefrom. The contaminated pellets are of inferior quality and utility.

Some improvement may be obtained in this respect by countersinking the bore holes at the rear face of the die. However, even with the best possible arrangement of the bore holes or passages, respectively, in the die plate, flat or essentially flat areas are still present at the rear face of the die, particularly in the areas in which four passages are grouped together, forming zones where the plastic material to be extruded is held up. Thus, the problem of partial deterioration and scorching or "burning" of the plastic material could also not be completely eliminated in such a die.

It is an object of the present invention to provide pelletizing apparatus which produces strands and pellets of extruded plastic material which are substantially free from partially deteriorated or "burnt" plastic particles.

Another object of the invention is the provision of an improved pelletizing die through which the strands of plastic material are extruded, prior to cutting them into pellets, and in which all hang-up areas have essentially been eliminated.

A further object of the invention is the provision of a simple inexpensive method of manufacturing the improved die.

Other objects and advantages of the invention will become apparent from the appended drawings and from the following detailed description of the invention.

DRAWINGS

DETAILED DESCRIPTION OF THE INVENTION

Figure 1:
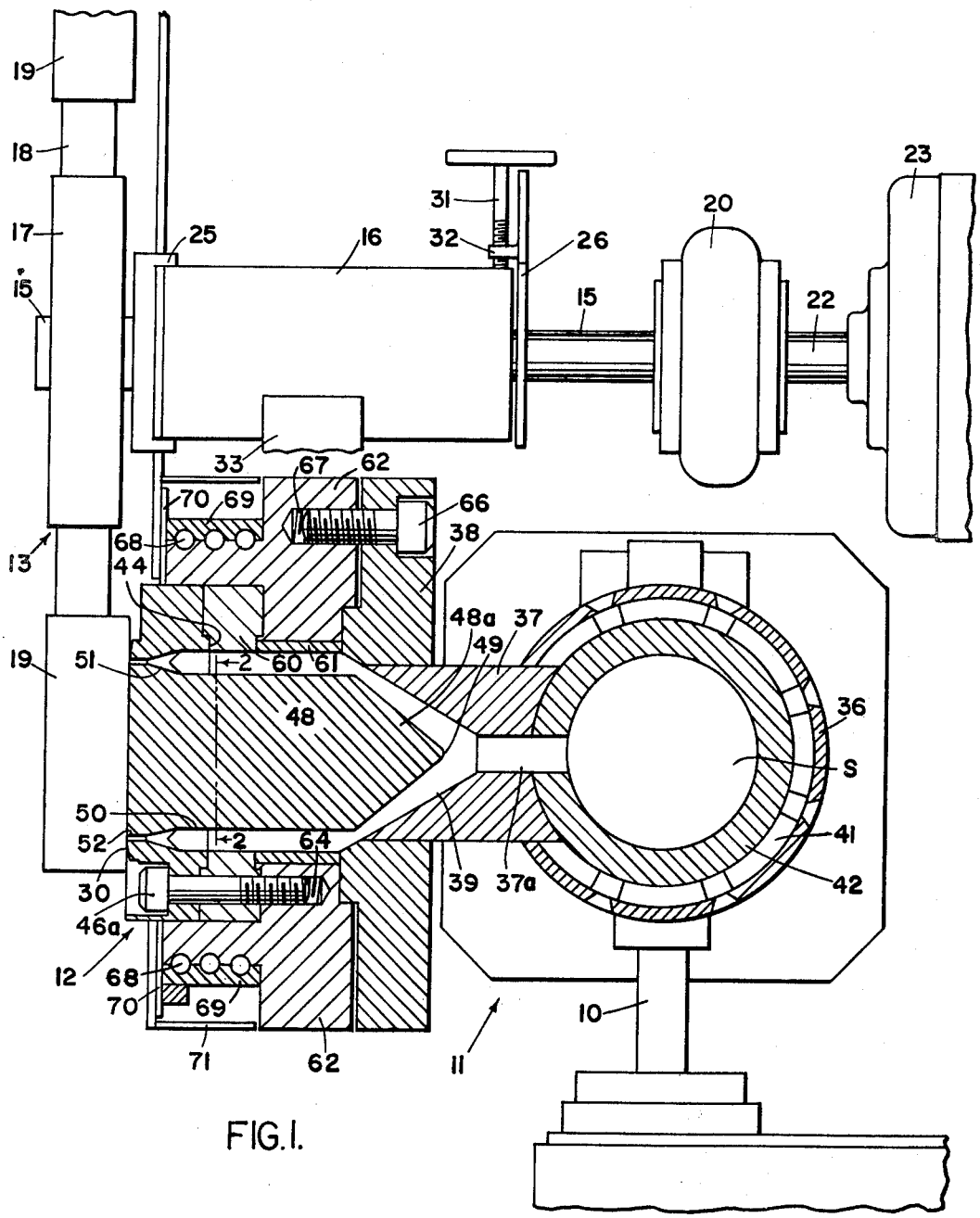
FIGURE 1 is a fragmentary, side elevational view, partially in section, of pelletizing apparatus constructed in accordance with the invention.

Referring now more particularly to FIGURE 1 wherein one embodiment of the invention is illustrated, the apparatus comprises support means 10, for an extruder generally designated by the reference numeral 11, and having an extrusion die assembly generally designated by reference numeral 12, and a coordinated rotary cutter assembly generally designated 13.

The rotary cutter assembly 13 which cuts the strands of material issuing from die assembly 12 into pellets includes a rotatable shaft 15 which is journaled in suitable bearings (not shown) provided in cylinder 16. Mounted on the free end of cutter shaft 15 (at the left in FIGURE 1) are scoket members 17 receiving blade shafts 18 on which cutting blades 19 are adjustably secured. The blade shafts 18 may be rotated in sockets 17 and moved in the direction of their length axes so as to achieve the best possible cutting performance for the particular material being processed. The shaft 15 may be coupled by a flexible and extensible coupling 20 to the shaft 22 of a drive motor 23. Energization of motor 23 will cause shaft 15 on the cutter knife assembly to rotate rapidly.

Cylinder 16 may be supported by a bracket 33 which is connected to die assembly 12 by means (not shown) which can be rocked horizontally and vertically so as to permit universal adjustment of the direction of the axis of cutter shaft 15. Suitable mechanism is disclosed and claimed in United States Patent 3,143,766.

The cylinder 16 furthermore preferably includes means (not shown) which control the longitudinal axial displacement of the shaft 15. Suitable mechanism for axially displacing the cutter shaft is also described and claimed in United States Patent 3,143,766. The cylinder 16 may be disposed in a circular flange member 25, and is also supported by a plate-like member 26 having lock screw 31 threaded to leg 32.

The material to be extruded in the form of strands for pelletizing is delivered by extruder 36 which may be a conventional screw extruder forwarding the material, e.g., a plastic at the temperature, viscosity and pressure, required for extrusion through a crosshead nozzle 37. A flange 38 is mounted on nozzle 37 to support the die assembly 12 and the opening 37a in nozzle 37 widens toward the left into a flaring funnel-shaped exit portion 39 which delivers the material to the die assembly 12.

The extruder 36 comprises a screw cylinder 42 which is surrounded by chambers 41 for a circulating heating medium for bringing the material to be extruded to the desired temperature and a forwarding screw S rotatably journaled coaxially in the screw cylinder 42. Any other suitable pump or extruder may be used in the apparatus of the present invention for forwarding the plasticized material at the pressure and temperature required for extrusion.

Figure 2:
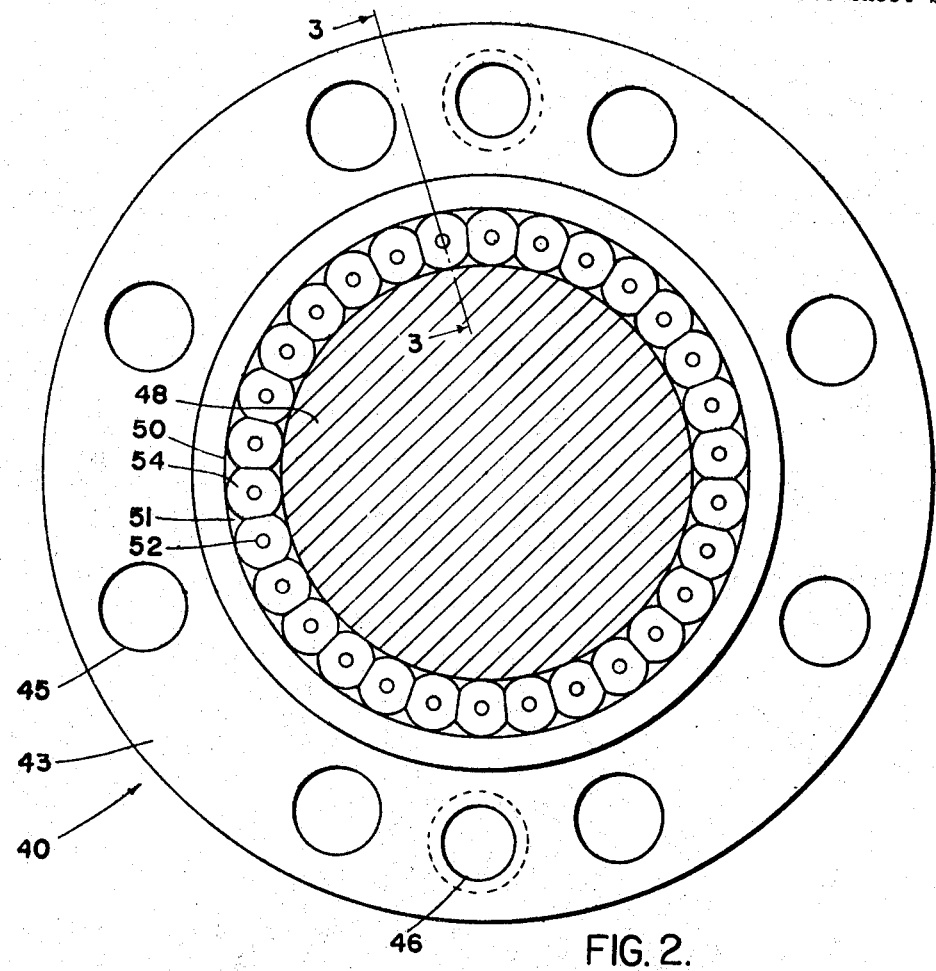
FIGURE 2 is an enlarged vertical, sectional view of the extrusion die only, taken along the line 2—2 of FIGURE 1.
Figure 3:
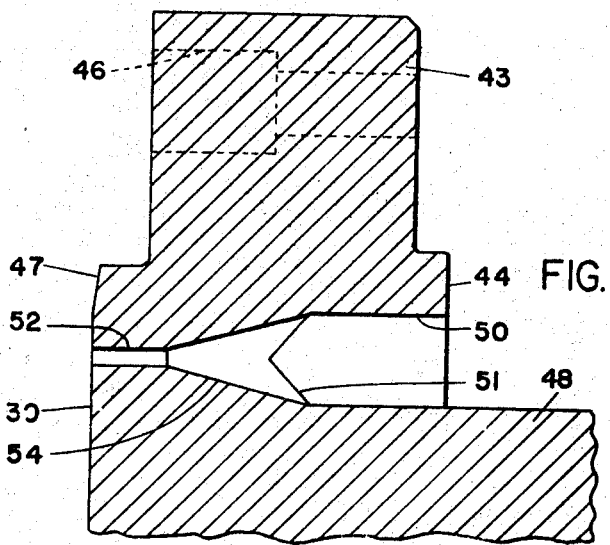
FIGURE 3 is an enlarged fragmentary vertical sectional view of the extrusion die, taken along the line 3—3 of FIGURE 2.

The die assembly 12 includes die 40 which is particularly illustrated in FIGURES 2 and 3 and has, besides front face 30, a rear face 44 and an annular flange 43 with positioning openings 45 and counterbored mounting openings 46 accommodating screws 46a. The front face 30 of the die is generally planar but may be slightly crowned at its peripheral edge 47. The central portion of the die extends rearwardly, forming a generally cylindrical distributing core 48 of a diameter essentially smaller than that of the rear face of the die and having a conical end section 48a with a slightly rounded apex 49. In the rear face 44 of the die, around core 48 is cut an annular groove 50 terminating in a V-groove 51. The cylindrical walls of groove 50 are essentially parallel to each other with the inner smaller diameter wall forming an extension of the cylindical wall of core 48. The V-groove 51 has, in this example of the die, an angle at the apex of approximately 90°.

Arranged in a circle around core 48 is a plurality of bores or cylindrical passages 52, with their length axes aligning with the apex of the circular V-groove 51. The bores 52 are countersunk at the rear face of the die as at 54 to form uniformly decreasing opening portions in which the maximum diameter of each counterbore 54 at the rear face of the die does not exceed the width of annular groove 50 or the maximum width of V-groove 51. In the illustrated example, the maximum diameter of each conical counterbore 54 is identical to the maximum width of the V-groove 51. If desired, the diameter of each counterbore 54 may be less than the maximum width of V-groove 51, provided all parts of the rear opening of each counterbore 54 fall within the maximum width of V-groove 51. Generally, it is preferred that the length axes of the cylindrical bores 52 and of the counterbores 54 align with the apex of the V-groove 51, as shown in FIGURES 1, 2 and 3, though this is not an absolute requirement for good operability of the die, as long as the conditions specified hereinbefore are fulfilled. The spacing of the cylindrical passages or bores 52 within the groove may vary slightly. They may be spaced such that the rear portions of the counterbores 54 are contiguous around groove 51. However, it is generally preferred that the rear portions of the counterbores 54 slightly overlap, as shown in FIGURE 2 and it is preferable that the angle of inclination of countersunk portions 54 be 45° or less, and less than the angle at the apex of V-groove 51.

The diameter of cylindrical passages or bores 52 may vary depending on the nature of the material to be extruded, and on the diameter of the strands or pellets desired. For the extrusion of thermoplastic high polymeric materials to be pelletized, the preferred range of diameters for the passages 52 is from about 0.02 to about 0.2 of an inch, and the most perferred range is from 0.06 of an inch to ⅛ of an inch, with the dimensions of the V-groove and of the counter sunk rear openings varying correspondingly. For special applications of the die, the diameters of the cylindrical portions of the passages may be smaller or larger than the stated range. The passages 52 have been illustrated as clyindrical bores but may be polygonal or irregular for particular applications.

The die illustrated in FIGURES 1–3 may be made in various ways. The circularly arranged passages 52 may be drilled first, thereafter the groove 50 and V-groove 51 may be cut, and finally the passages 52 may be provided with the countersunk portions 54. Alternatively, the groove 50 and V-groove 51 may be cut first and the passages 52 then drilled, after which the portions 54 may be cut. For best performance it is desirable to smooth out all holes and surfaces along the path of the material to be extruded and to provide a sharp edge where the passages 52 meet the front face of the die.

The die assembly 12 may comprise, in addition to the die member 40 just described, annular members 60 and 61 which form a cylindrical tube having a diameter aligning with the outer diameter of the annular groove 50. Die 40 and annular members 60 and 61 are enclosed by an angular flange member 62 and screws 46a, seated in threaded openings 64 secure the parts in assembled relation. The die assembly 12 is connected to and tightly held to flange 38 by screws 66, which are accommodated in threaded openings 67 in the radially outer portions of flange member 62.

All around ring portion 62b of flange member 62 grooves having a half-circular cross section are provided into which are inserted circular heating rods 68 which are preferably of the electrically energized type, and suitable control means (not shown), are utilized for maintaining the desired temperature in the die member 40. The heating rods are covered on the outside by a ring 69 of a heat insulating material to which is joined a heat shield 70 likewise of heat insulating material. The heating zone is also closed off by a cylindrical cover 71. If desired, the die assembly may be made in one piece, or constructed of differently shaped and dimensioned parts.

The die member 40 and cylindrical members 60 and 61 form, together with the core 47, a passageway leading toward the die 40 which provides a smooth path for the plastic material to be extruded. The unique design of the die and of the die assembly permits the plastic material to flow continuously between the extruder and the exit orifices of the die at equal flow rates over each individual cross section. The absence of areas where the material may be potentially held up lets the plastic material flow at a steady flow rate through the assembly and no portions of the plastic material are overheated by being subjected to high temperatures for any longer period than the remainder of the material. Thus, no portions of the plastic material are subjected to "burning" or partial decomposition as a result of being exposed to the high temperatures in the die assembly for excessive lengths of time. The pelletizing apparatus of the present invention not only produces pellets of superior quality, but permits the apparatus also to operate with plastic materials which are particularly sensitive to high temperatures or, in the alternative, permits a given material to extrude at higher temperatures and consequently at higher linear extrusion rates than was possible with the pelletizing apparatus of the prior art, without deleterious effect on the quality of the pellets produced.

The operation of the pelletizing machine of the present invention is readily apparent from the foregoing description. The operator starts the motor 23 so as to rotate the cutter assembly at the desired rate of speed, adjusts the cutter knives in their relative position and angle to the die face 30 and starts the extruder. The strands of material emanating from the orifice at the die face are rapidly cut by the rotating knives 19 into small pellets, the length of which can be varied by adjusting the rate of extrusion of the strands in relation to the rotational speed of the cutter knives. The apparatus may be provided with a suitable hood (not shown) having a water spray for cooling the pellets which are then accumulated and placed into suitable storage containers.

Figure 4:
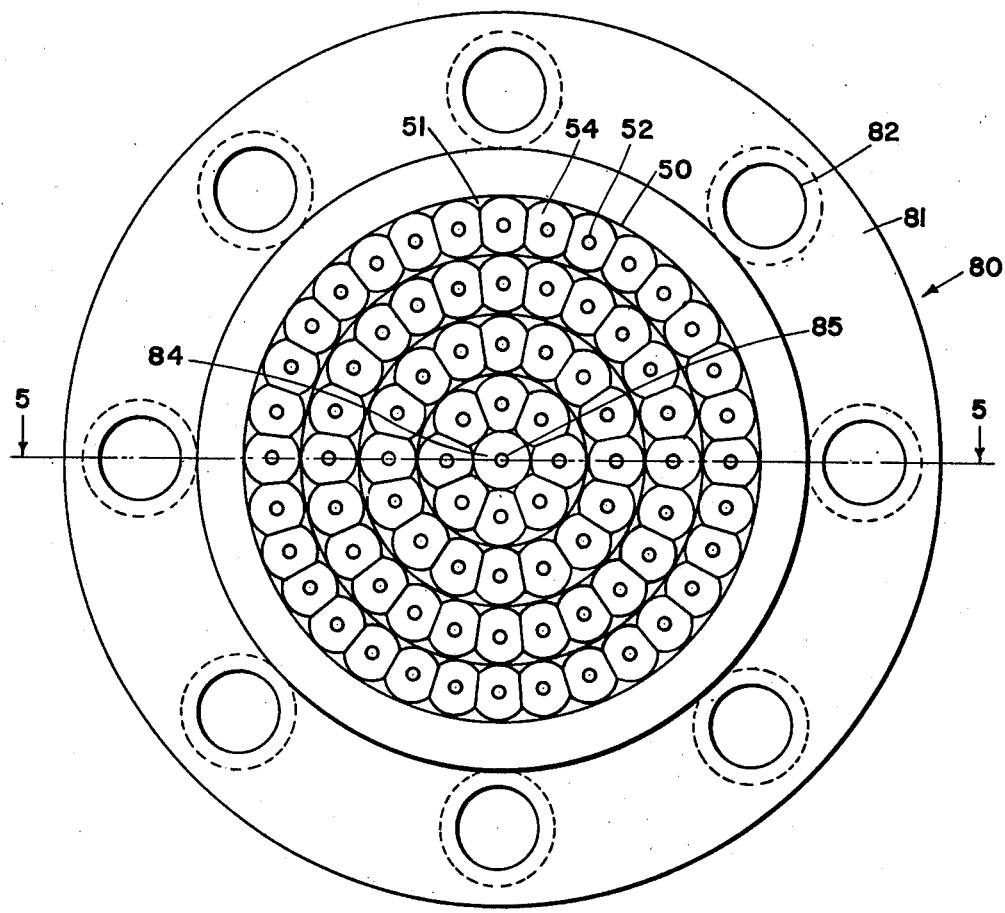
FIGURE 4 is a rear elevational view of a modified extrusion die in which a multiplicity of concentric V-grooves are employed.
Figure 5:
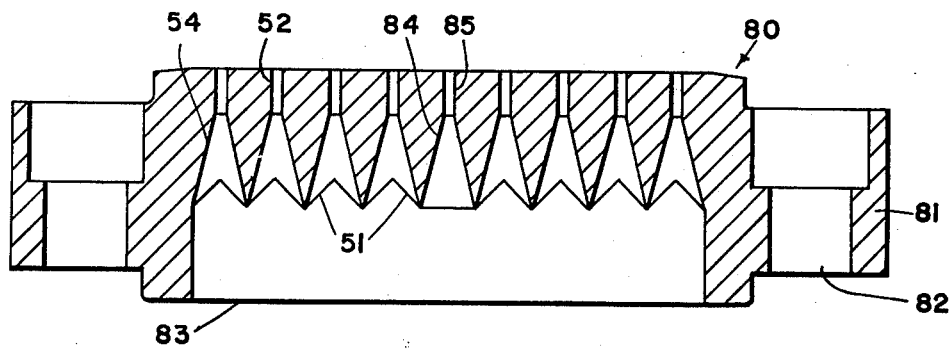
FIGURE 5 is a sectional plan view taken on the line 5—5 of FIGURE 4.

Another embodiment of the invention is illustrated in FIGURES 4 and 5 of the appended drawings. Die body 80 is provided with a circular flange 81 having mounting openings 82. In the rear portion 83 of the die body a plurality of closely spaced concentric V-grooves 51 are cut around a central countersunk portion 84 leading to a central exit port 85 and identical exit ports 52 and countersunk portions 54 are provided leading from the grooves 51. The concentric V-grooves are closely spaced to each other and countersunk opening 84 so as to form a series of concentric sharp ridges with no flat areas between them. In this manner, all areas at the rear portion of the die are inclined so that there is no possibility that the plastic material to be extruded will be held up in any area at the rear portion of the die.

The novel die described hereinbefore may also find use in apparatus other than pelletizing apparatus where it is desired to extrude thermoplastic materials in the form of strands of appreciable diameter, i.e., of a diameter of about 0.05 inch or more.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:
1. Pelletizing apparatus comprising: relatively movable cutter means and extruder means including at least one extrusion die for extruding strand-like material, to be pelletized, said extrusion die having a front face adjacent said cutter means and a rear portion with at least one circular V-groove in the rear portion; an annular passage formed in said rear portion communicating with said V-groove and terminating within the maximum width of said V-groove of said die; and a plurality of passages extending between the front face and rear portion of said die, the rear portions of said passages being widened so as to form rearwardly conically flaring rear openings, and said passages being arranged in circular fashion so that their rear portions lead from the V-groove.

2. Pelletizing apparatus comprising: relatively movable cutter means and extruder means including at least one extrusion die for extruding strand-like material, to be pelletized; said extrusion die having a front face adjacent said cutter means and a rear portion with at least one circular V-groove in the rear portion of said die; and a plurality of passages extending between the front face and rear portion of said die, the rear portions of said passages being widened so as to form rearwardly conically flaring rear openings, and said passages being arranged in circular fashion so that their rear portions lead from the V-groove; the maximum diameter of said passenges being not greater than the maximum width of the V-groove.

3. The combination defined in claim 2 wherein said passages are cylindrical adjacent the front face of the die and overlap in the rear portion of the die within the V-groove.

4. Pelletizing apparatus comprising: relatively movable cutter means and extruder means including at least one extrusion die for extruding strand-like material, to be pelletized; said extrusion die having an outlet face in confronting relation with said cutter means an inlet portion with at least one circular V-groove therein; an annular passage formed in said extrusion die communicating with said V-groove, and terminating within the maximum width of said V-groove of said die; and a plurality of passages extending between said outlet face and said inlet portion of said die, portions of said passages being widened so as to form conically flaring openings, and said passages being cylindrical adjacent said outlet face and arranged in circular fashion so that their said widened portions lead from and have common borders within the V-groove.

5. Pelletizing apparatus comprising: relatively movable cutter means and extruder means including at least one extrusion die for extruding strand-like material, to be pelletized, said extrusion die having an outlet face in confronting relation with said cutter means and an inlet portion with at least one circular V-groove therein; and a plurality of passages extending between said face and said portion of said die, portions of said passages being widened so as to form conically flaring openings, the maximum diameter of said passages being not greater than the maximum width of the V-groove; the individual passages being spaced within each V-groove such that the conically flaring openings of each two neighboring passages within one and the same groove have a common border.

6. An extrusion die for use in pelletizing and extrusion apparatus for plastic material and the like, which comprises: a plate-like die body having an outlet face and an inlet portion; a plurality of concentrically arranged circular V-grooves in the inlet portion of said die in adjoining relationship; a plurality of passages extending between said outlet face and said inlet portion, portions of each of said passages being widened so as to form a conically flaring portion which is at its largest diameter not wider than the base of the V-groove in which it is located, said passages being arranged in circular fashion such that their length axes align approximately with the apices of the circular V-grooves and the widened openings of said passages open into the V-grooves; said passages being spaced within each of the grooves such that the widened openings of each two neighboring passages, located in one and the same V-groove have a common border.

7. Pelletizing apparatus comprising: relatively movable cutter means and extruder means including at least one extrusion die for extruding strand-like material, to be pelletized, said extrusion die having a front face adjacent said cutter means and a rear portion with a plurality of concentrically arranged circular contiguous V-grooves forming sharp ridges therebetween; and a plurality of passages extending between the front face and the rear portion of said die, the rear portions of each of said passages flaring conically rearwardly into said V-grooves, said passages being arranged being arranged in circular fashion so that their length axes align with the apex of the circular V-grooves.

8. Pelletizing apparatus comprising; rotary cutter means; extruder means including at least one extrusion die for extruding strand-like material, to be pelletized, into the path of rotation of said cutter means, said extrusion die having a front face adjacent said cutter means and a rear portion with a plurality of concentrically arranged circular contiguous V-grooves forming sharp ridges therebetween; and a plurality of passages extending between the front face and the rear portion of said die, the rear portions of each of said passages flaring conically rearwardly into said V-grooves, said passages being arranged in circular fashion so that their length axes align with the apex of the circular V-grooves.

9. Pelletizing apparatus as set forth in claim 8 wherein the largest diameter of said conically rear portions is not wider than the width of said V-groove.

10. The pelletizing apparatus of claim 8, wherein the individual passages are spaced within each V-groove such that the wide rear openings of each two neighboring passages within one and the same groove overlap.

11. Pelletizing apparatus comprising: rotary cutter means; extruder means including at least one extrusion die for the extrusion of strand-like material to be pelletized into the path of rotation of said cutter means, said extrusion die having a front face adjacent said cutter means and a rear portion with a circular V-groove therein; a plurality of passages extending between the front face and the rear portion of said die, the rear portion of each of said passages being countersunk so as to form a conically flaring rear portion which is at its largest diameter not wider than the width of the base of said V-groove, said passages being arranged in circular fashion so that their length axes align with the apex of the circular V-groove and the rear portions of the passages lie within the V-groove, and being spaced within the V-groove such that they overlap within the V-groove; said die comprising furthermore a generally cylindrical central core joined centrally to the rear of the die and located concentrically with said V-groove, the front end of the core having a conical shape; and housing means forming a passageway for the material to be extruded around the core, which has a width and a diameter approximately corresponding to the respective dimensions of said V-groove.

12. An extrusion die for use in pelletizing and extrusion apparatus for plastic material and the like, which comprises: a plate-like die body having a front face and a rear portion; a plurality of concentrically arranged circular V-grooves in the rear portion of said die in adjoining relationship; a plurality of passages extending between said front face and said rear portion, the rear portions of each of said passages being rearwardly widened so as to form a conically flaring rear portion which is at its largest diameter not wider than the base of the V-groove in which it is located, said passages being arranged in circular fashion such that their length axes align approximately with the apices of the circular V-grooves and the wide rear openings of said passages open into the V-grooves.

13. The extruding die of claim 12 in which the passages are spaced within each of the grooves such that the wide rear openings of each two neighboring passages, located in one and the same V-groove, overlap.

References Cited

UNITED STATES PATENTS

| | | | |
|---|---|---|---|
| 2,594,894 | 4/1952 | Fehrenbach | 18—12 |
| 3,230,582 | 1/1966 | Hoffman et al. | 18—12 |
| 3,287,764 | 11/1966 | Swickard et al. | 18—12 |

FOREIGN PATENTS

| | | |
|---|---|---|
| 220,049 | 7/1957 | Australia. |

WILLIAM J. STEPHENSON, Primary Examiner